United States Patent [19]
Grace

[11] Patent Number: 4,712,170
[45] Date of Patent: Dec. 8, 1987

[54] POWER SUPPLY HAVING TUNED RADIO FREQUENCY CIRCUIT

[75] Inventor: Alan G. V. Grace, San Bruno

[73] Assignee: Power Modifications Incorporated, Hayward, Calif.

[21] Appl. No.: 826,942

[22] Filed: Feb. 6, 1986

Related U.S. Application Data

[63] Continuation-in-part of Ser. No. 727,180, Apr. 25, 1985.

[51] Int. Cl.[4] .............................................. H02P 13/20
[52] U.S. Cl. ....................................... 363/98; 363/132; 315/DIG. 7
[58] Field of Search ................... 363/97, 98, 131, 132; 315/DIG. 5, DIG. 7; 323/244

[56] References Cited

U.S. PATENT DOCUMENTS

| | | | |
|---|---|---|---|
| 4,004,185 | 1/1977 | Edmondson et al. | 315/105 |
| 4,188,660 | 2/1980 | Knoll | 315/205 |
| 4,572,990 | 2/1986 | Leale et al. | 315/220 |

FOREIGN PATENT DOCUMENTS

| | | | |
|---|---|---|---|
| 2551150 | 5/1977 | Fed. Rep. of Germany | 363/97 |

*Primary Examiner*—Peter S. Wong
*Assistant Examiner*—Judson H. Jones
*Attorney, Agent, or Firm*—Townsend and Townsend

[57] ABSTRACT

A tuned circuit radio frequency power supply is disclosed. A conventional voltage doubler drives a power oscillator having a variable output frequency and variable amplitude input. The power oscillator output is connected to a tuned RLC circuit incorporating a load; a voltmeter coupled to the circuit measures overall phase of the RLC circuit and inputs to a phase comparator within the oscillator. Tuning of the RLC circuit is done by frequency comparison with circuit lead requiring increased oscillator frequency and circuit lag requiring decreased oscillator frequency. A switched resistance network preset for tube length, width and color of neon is placed in series with the oscillator input voltage. This resistance network outputs to an integrating amplifier, through an opto-isolator to control the amplitude of the oscillator input. The amplitude of the oscillator input thus controlled the output voltage of the RLC circuit to maintain optimum voltage for tube length, width and color of neon. Neon striation caused by negative resistance or non-linearity in the neon tube (typically responsive the changing voltage) is prevented by inductively tapping with few turns the primary of the output transformer. This inductively tapped power is fed back to a series connected capacitor in the oscillator voltage input circuit. Consequently, non-linearities or negative resistance is damped, prolonging tube electrode life and producing optimum neon glow. In the case of a neon lamp power supply, there results a light weight power supply having a small radio frequency inductance which strikes the neon lamp, maintains the neon lamp at minimum energy levels, adjusts the lamp to various changes in operating parameters, lessens fire danger and minimizes radio frequency interference.

12 Claims, 18 Drawing Figures

FIG._3A.
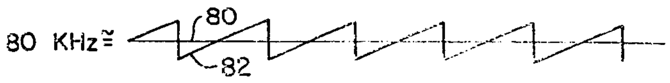
FIG._3B.
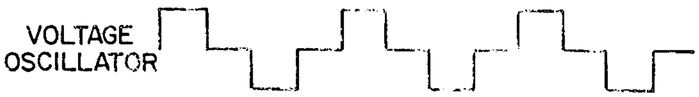
FIG._3C.
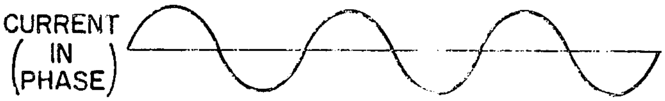
FIG._3D.
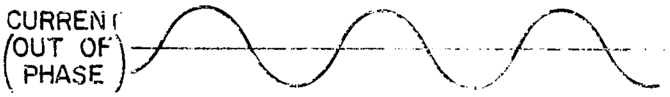
FIG._3E.
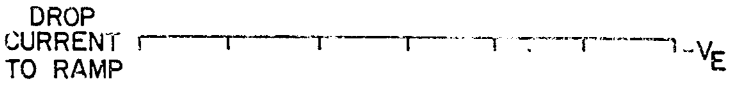
FIG._6A.
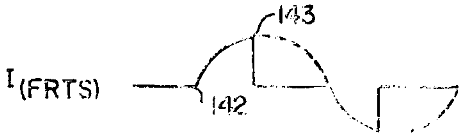
FIG._6B.
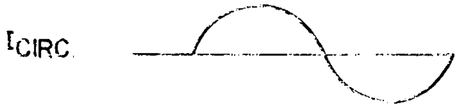
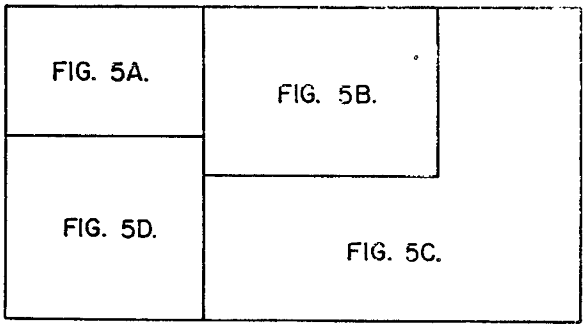
FIG._5.

POWER SUPPLY HAVING TUNED RADIO FREQUENCY CIRCUIT

This patent application is a continuation-in-part of Ser. No. 727,180, filed Apr. 25, 1985.

BACKGROUND OF THE INVENTION

This invention relates to power supplies and more specifically a radio frequency tuned power supply for powering loads such as neon signs.

STATEMENT OF THE RELEVANT LITERATURE

Low voltage input and high voltage output power supplies, such as transformers commonly used for neon signs, are increasingly unsuitable for modern use. Typically, such power supplies step up the voltages at line frequencies. Transformers include magnetic losses and often utilize magnetic choking with the result that considerable heat energy is generated and must be dissipated.

High voltage generated at line frequencies is dangerous. The voltage penetrates when conducting. When shorted the penetrating voltage burns and causes fires. This is well known.

When used to drive neon light sources, high voltage at line frequencies generates both conductive radio frequency noise and broadcast radio frequency noise. The mechanism by which this occurs includes the 240 Hz striking and extinguishment of neon. With alternating current, neon stops illuminating or firing in approximately one millisecond. When a neon light tube is supplied with power at 60 Hz, a 16 millisecond cycle results. Observable flicker occurs. The resultant interference comes from the switching which occurs as the neon is successively lit and thereafter extinguished. It is rather clear that if neon lighting was offered with its present power sources as a "new" lighting apparatus and method, it would be rejected as failing to meet required radio frequency standards.

It is also known that the switching decreases electrode life and, hence, tube life. Observable electrode etching results from this switching effect.

Conventional switching power supplies also have difficulty. Switches open and close generating square wave forms with undesired harmonics. Large switching losses are present. Chocking is required for energy storage and desired DC output. Diodes have a hostile reverse recovery environment; consequently, only expensive diodes with short recovery times may be used.

Neon when illuminated in a neon lamp tube at radio frequencies includes non-linearities of resistance or as I prefer to call them "negative resistance". Neon is an extremely difficult load to regulate because of these non-linearities.

Further, it is well known that driving of a neon load at optimum voltage is desirable. Unfortunately, this optimum voltage is dependent upon the length of the neon, the width of the neon tubing and the particular color used. The prior art has solved this problem by having a vocabulary of discretely different transformers for differing loads.

Finally, neon tubes are plagued by an effect known as "striation". This effect can be observed as a color intensity banding in the vicinity of the electrodes. Such striation effects are in part due to the negative resistance of the neon. Other parts of these striation effects are extremely complex relating to the applicable gas plasma physics and are not completely understood.

SUMMARY OF THE INVENTION

The preferred embodiment of this continuation-in-part is summarized as follows.

A tuned circuit radio frequency power supply is disclosed. A conventional voltage doubler drives a power oscillator having a variable output frequency and variable amplitude input. The power oscillator output is connected to a tuned RLC circuit incorporating a load; a voltmeter coupled to the circuit measures overall phase of the RLC circuit and inputs to a phase comparator within the oscillator. Tuning of the RLC circuit is done by frequency comparison with circuit lead requiring increased oscillator frequency and circuit lag requiring decreased oscillator frequency. A switched resistance network preset for tube length, width and color of neon is placed in series with the oscillator input voltage. This resistance network outputs to an integrating amplifier, through an opto-isolator to control the amplitude of the oscillator input. The amplitude of the oscillator input thus controlled the output voltage of the RLC circuit to maintain optimum voltage for tube length, width and color of neon. Neon striation caused by negative resistance or non-linearity in the neon tube (typically responsive the changing voltage) is prevented by inductively tapping with few turns the primary of the output transformer. This inductively tapped power is fed back to a series connected capacitor in the oscillator voltage input circuit. Consequently, non-linearities or negative resistance is damped, prolonging tube electrode life and producing optimum neon glow. In the case of a neon lamp power supply, there results a light weight power supply having a small radio frequency inductance which strikes the neon lamp, maintains the neon lamp at minimum energy levels, adjusts the lamp to various changes in operating parameters, lessens fire danger and minimizes radio frequency interference.

PREFERRED EMBODIMENT OF PREVIOUS DISCLOSURE

A tuned circuit radio frequency power supply is disclosed. A conventional voltage doubler drives a power oscillator having a variable output frequency and variable duty cycle. The power oscillator output is connected to a tuned RLC circuit incorporating a load. A voltmeter coupled to the circuit measures overall phase of the RLC circuit and inputs to a phase comparator within the oscillator. Tuning of the RLC circuit is done by frequency comparison with circuit lead requiring increased oscillator frequency and circuit lag requiring decreased oscillator frequency. An ammeter is placed in series with the neon circuit and controls the oscillator duty cycle to maintain constant current despite changes in load. Consequently, power is adjusted from the oscillator, preferably by varying trigger level on a ramp voltage generator. In the case of a neon lamp power supply, there results a light weight power supply having a small radio frequency inductance which strikes the neon lamp, maintains the neon lamp at minimum energy levels, adjusts the lamp to various changes in operating parameters and lessens fire danger and minimizes radio frequency interference. In the case of conventional power supplies there is a power supply which does not require choking, has low switching losses and utilizes a small and compact step-down transformer.

OTHER OBJECTS, FEATURES AND ADVANTAGES OF THIS INVENTION

An object of this invention is to use an RLC circuit drive as a power supply for a load. According to this aspect of the invention, a power oscillator having variable duty cycle and variable frequency outputs in the range of 40 kHz to an RLC circuit. The circuit includes two reactive elements, these elements being an inductor and a capacitor. An oscillating power supply drives the circuit. Frequency and duty cycle are adjusted at the oscillator to maintain the circuit tuned and the current constant through the load.

An advantage of the disclosed circuit is that voltage is controlled through oscillator frequency independent of the load.

A further advantage is that load current is controlled through circuit duty cycle, independent of circuit voltage.

An additional advantage is that this circuit can be used for multiple loads including powering of neon lights at high voltage to conventional power supplies at low voltage.

An advantage of this power supply is that it is readily adapted to neon lamps.

A further advantage of this power supply is that modification to a 200 kHz power supply is possible. Computer and computer peripherals can readily use the disclosed power supply design.

An advantage of the invention is that it can be used as a radio frequency power for driving a neon tube. Given a short circuit condition, the radio frequency power is a surface conductor; penetration of the generated power is vastly reduced. Resultant fire danger is correspondingly reduced.

An additional advantage of this invention is that the frequency of alternation is greater than the one millisecond extinguishment time of electrically excited neon. This being the case, the powered neon lamp continuously glows. This continuous glow does away with radio frequency effect experienced at high voltage line frequency power supplies. Both conductive radio interference and radiated radio interference are vastly reduced or eliminated.

An additional object of this invention is to disclose an apparatus and method for tuning an RLC circuit including a load such as a neon lamp. According to this aspect of the invention, the voltage of the oscillator is compared to the voltage in the circuit. Where the reactance of the circuit produces an overall voltage component that lags the oscillator voltage, the frequency is increased to tune the circuit. Where the reactance of the circuit produces an overall voltage component that leads that of the oscillator circuit, the frequency is decreased. Automated tuning of the power supply results for minimum conduction with maximum power delivery.

An advantage of this invention is that it is dynamically tuned to the varying parameters encountered in load operation, especially lighting loads in neon tubes. For example, where temperatures change or operating parameters within the neon change, the circuit will automatically adjust.

Yet a further object of this invention is to disclose an adjustable duty cycle for forcing constant current through a load, such as a neon tube. Accordingly, in series with the neon load there is placed an ammeter. This ammeter is connected to a duty cycle control at the oscillator. The duty cycle is varied to assure constant current through a connected neon load. Where the load is a long neon tube and the voltage must increase by the required 1200 volts per foot of a neon tube, duty cycle of the power supply is increased. The power supply matches up to full capacity any length neon load driven by the power supply.

An advantage of this aspect of the invention is that different power supplies are not required for different neon loads. Matching of an entire vocabulary of power supplies is not required, as in the case of present line frequency, high voltage neon power transformers and power supplies.

It will be understood by the reader that the duty cycle control and phase control are interrelated and cooperate especially in the case of a neon load. This cooperation achieves many advantages.

A first advantage is that the power supply automatically drives to strike voltage a neon sign and thereafter maintains the voltage at a maintenance voltage.

A second advantage is that when the voltage is maintained at the maintenance voltage, current flow can be tailored to the most energy efficient portion of a neon lighting curve.

Yet another advantage of the disclosed circuit is that it is adaptable. It is adaptable to various lengths of neon connected. It is adaptable to various changes in operating parameters. These changes in operating parameters can include temperature extremes, changes in tube age and other load operating parameters. Moreover, a relatively wide fluctuation in driving line voltages. For example, 80 volts AC to 150 volts AC will produce satisfactory output.

Yet a further advantage of this invention is that the required mass of the power supply is vastly reduced. No longer is a large specially tailored conductive core required. Since the requirement for core size is inversely proportional to frequency, a comparatively small core utilized with the disclosed inductor is sufficient for the radio frequencies used.

Yet another advantage of this invention is that neon light length is increased. Typically, there is an on and off "flicker" adjacent the anode and cathode at the extreme ends of neon tubes. This anode and cathode flicker causes electrode etching and premature aging when line frequency high voltage power supplies are used. With the present invention, because of the constant glow provided to the neon, electrode etching is reduced or eliminated. Tube life is vastly increased.

An additional advantage of the disclosed power supply is that it can be used for conventional low voltage loads. According to this aspect, a transformer is placed in series with reactive elements. Voltage out is typically controlled by modifying the duty cycle.

An advantage of this aspect of the invention is that a power supply having a sine wave driving power source is disclosed. Noise generated by square wave switching devices is absent.

A further advantage is that the power supply includes a tuned sine wave drive. This tuned sine wave drive is power efficient. Switching losses are minimized. Diodes with relatively long recovery times may be used.

An object of the continuation-in-part disclosure of this invention is to disclose an oscillator input voltage following amplitude control for an oscillating circuit driving a high voltage RLC circuit power supply such as a neon lamp. According to this aspect of the invention, an RLC circuit is driven by an oscillator and frequency controlled to output circuit oscillation with minimum reactance. The oscillator power is output through a switched resistance network, the network enabling resistance to be varied for optimum voltage of the driven load. The output of the resistance network passes through an integrator amplifier which drives an optically isolated rectifier duty cycle network through an opto-isolator. The duty cycle changes the power output of the rectifiers, preferably through a triac to drive the original oscillation with an energy amplitude sufficient to maintain the selected voltage in the circuit at the optimum energy level.

An advantage of the disclosed circuit is that the resistance can be switched. The optimum drive voltage can be selected for neon tubes dependent upon tube length, tube width and tube color. The optimum drive voltage can either be obtained from a table or emirically determined in the field.

Yet another object of the invention is to disclose a following circuit for preventing negative resistance oscillations in the neon. According to this aspect of the invention, the circuit load is output through a transformer having the primary connected in the RLC circuit and having the secondary connected across the driven load, here the neon tube. The transformer is tapped at the primary with a nominal number of windings (in the order of 2) and this output rectified. The rectified output is then placed across a capacitor in series with the voltage input to the oscillator. This placement in series with the voltage input to the oscillator permits the oscillator input to sense non-linearities or negative resistance in the load. Consequently the oscillator input follows the tendency of the tube to have non-linearities and actively damps such linearities.

An advantage of this aspect of this invention is that striations are suppressed in neon tubes.

Yet another object of this invention is to disclose a technique for sizing of the transformer with the oscillation. According to this aspect of the invention, a conventional U-core ferrite transformer with the oscillation. According to this aspect of the invention, a conventional U-core ferrite transformer is driven at 31 kHz. The transformer is not sized for a 31 kHz vibration. Instead it is sized for a 63 kHz vibration, the third harmonic of the 21 kHz vibration. Consequently, the transformer is reduced in size to ⅓ of that size required.

An advantage of this aspect of the invention is the transformer size is kept to a minimum. Moreover, transformer construction can be kept within economical ranges.

Yet another advantage is that the transformer design with the third and fifth harmonics present have been found to act together to further prevent striation in the neon.

BRIEF DESCRIPTION OF THE FIGURES

Other objects, features and advantages of this invention will become more apparent after referring to the following investigation and attached drawings in which:

FIGS. 3A–3E are a timing diagrams in which:

FIG. 3A illustrates ramp voltage output;

FIG. 3B illustrates resultant power oscillator square wave output;

FIG. 3C plots the in-phase of voltage from the voltage oscillator with the voltage being reduced to a sine format;

FIG. 3D shows the voltage in the RLC circuits; and

FIG. 3E shows the sample addition of the curves of FIGS. 3C and 3D to give a negative component utilized for adjusting frequency in the oscillator;

FIG. 6*a* is a plot of oscillator voltage attributable to switch cycle only;

FIG. 6*b* is a plot of oscillator voltage where commutation of the oscillator voltage is allowed; and, FIG. 7 is a diagram showing the power supply of this invention utilized at conventional voltages.

DETAILED DESCRIPTION OF THE EMBODIMENTS

Figure 1:
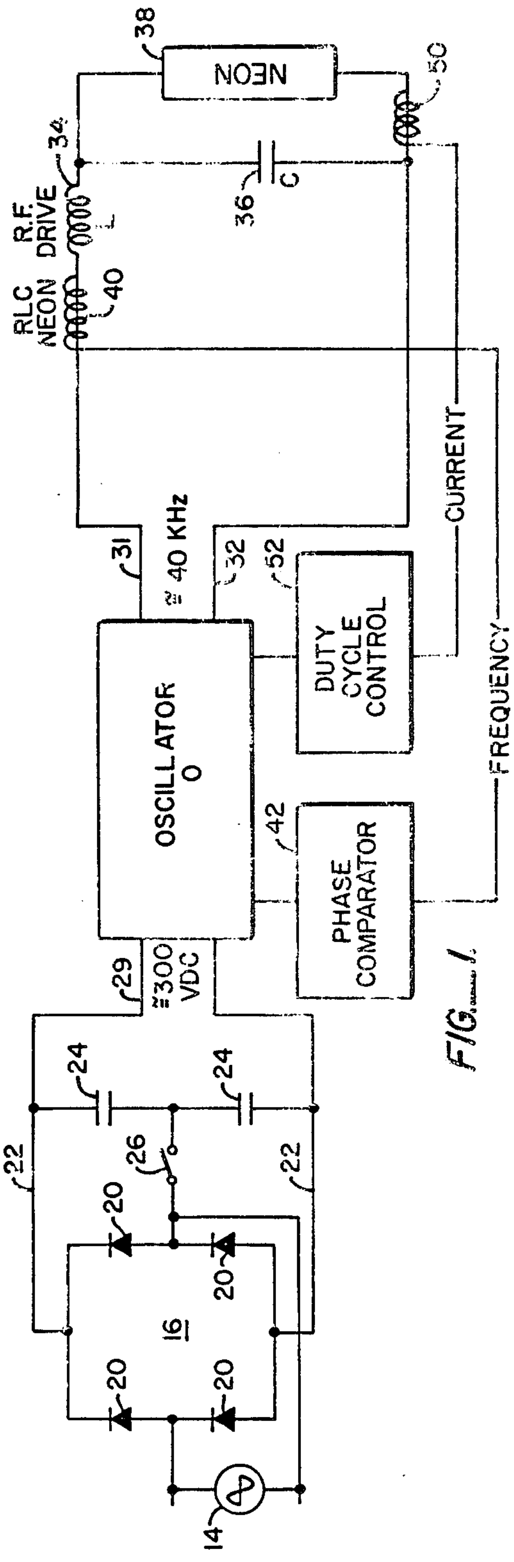
FIG. 1 is a schematic diagram illustrating the key elements of this invention including the frequency doubler, power supply with full wave rectification oscillator and the RLC circuit, this circuit here shown with the power supply preferred neon load thereon.

Referring to FIG. 1, a line voltage source 14 drives a frequency doubler circuit 16. This circuit includes diodes 20 placed in parallel across circuit output lines 22. A pair of capacitors 24 completes the well-understood circuit which results in voltage doubling.

For higher input voltages, it is known to close in such a circuit a switch 26 to convert the frequency doubler circuit to a full wave rectifier circuit having similar oscillation. This is desirable for European voltage formats. Output of the frequency doubler circuit is to conventional oscillator O.

Oscillator O has inputs 29 in the range of 300 volts DC at line frequencies (that is either 50 or 60 Hz). Output of the conventional oscillator is in the range of 40 kHz to a tuned RLC circuit.

Having set forth the frequency doubler and oscillator, attention may now be directed to the RLC circuit.

The 40 kHz output of oscillator O is connected to the RLC circuit at inputs 31, 32. Paired reactance elements including inductor 34 and capacitor 36 together provide the circuit with the ambient reactance. As is well known, the position of these elements may be interchanged.

Neon load 38 completes the RLC circuit. Load 38, capacitance 36 and inductance 34 together provide a total reactance which constitutes the true circuit "load." Typically, the neon is placed in parallel across the resonating circuit to one of the reactances 34, 36. The neon is here illustrated placed in parallel with the capacitance 36 at load 38.

Sampling of the circuit for control occurs at two places. First, a frequency sample 40 (here a voltmeter detection) is taken of the circuit and compared in lag or lead to the voltage of the oscillator O. Such comparison occurs at a phase comparator 42.

Secondly, current through the neon load 38 is measured at ammeter connection 50. Output of connection 50 is to a duty cycle control 52. Duty cycle control 52 functions to drive the same current through load 38, here shown in the preferable form of a neon lamp.

Having set forth the overall schematic of the power supply circuit, attention will now be addressed to the known characteristics in voltage and current operating parameters of a neon bulb. This will be shown with respect to FIG. 4.

Thereafter, and with reference to FIGS. 2 and 3A–E, a discussion of current lag and lead to tune the circuit and duty cycle to drive the circuit will be set forth. Finally, and with respect to FIGS. 5A–5D, the actual circuitry required will be discussed.

Figure 4:
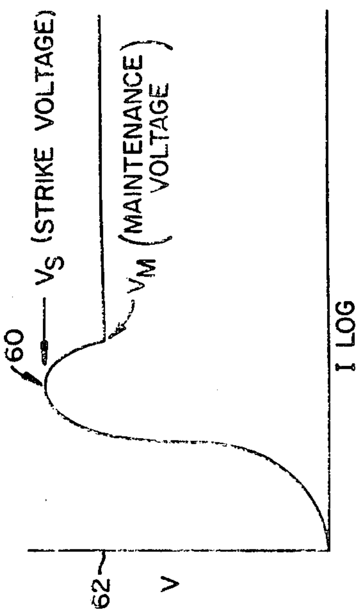
FIG. 4 is a known diagram of voltage plotted to the log of current illustrating the strike voltage and current and maintenance voltage and current accommodated in lighting neon lamps.

Referring to FIG. 4, voltage is plotted linearly on the ordinate and the log of current on the abscissa. As can be seen, when current is forced through a neon tube, the voltage rises to a strike point 60. Thereafter, as current increases, voltage decreases to a maintenance voltage level denominated 62 on the ordinate. If the current is continued to be increased, the voltage 62 remains substantially constant. The current, however, increases exponentially without suitable control. There results a run away increased power consumption and uncontrolled lighting effect.

Naturally, optimum design requires that current flow be as close to the discontinuity between the sloping strike voltage curve and the horizontal and linear portion of the maintenance voltage curve. At this juncture, neon lamps output substantially optimum light with minimum power input.

As will hereinafter be explained, this disclosed power supply is tunable to maintain at an optimum current flow through the neon tube. This current flow will be maintained at an optimum even though the strike voltage and maintenance voltage change dramatically. An example may clarify.

Neon tubes typically require 1,200 volts peak to peak per foot to be optimally driven. Commercially, lengths of over 10 feet have been known to be utilized.

Taking the example of a 10 foot tube, one recognizes that 1,502 volts RMS must be utilized. When it is realized that the peak voltages encountered in a root mean square situation are as high as 4,247 volts and that the voltage is driven negatively as far as it is positively, it is immediately understood that an overall 12,000 volt fluctuation is not uncommon in a neon environment.

Take the case where a five foot tube is substituted for a 10 foot tube. Under current technology the transformers must be tailored for the load encountered.

As will hereinafter be explained with references to FIGS. 2 and 3, tuning of the circuit as well as the tailoring of the duty cycle enable the disclosed invention to operate variantly to meet these parameters.

Figure 2:
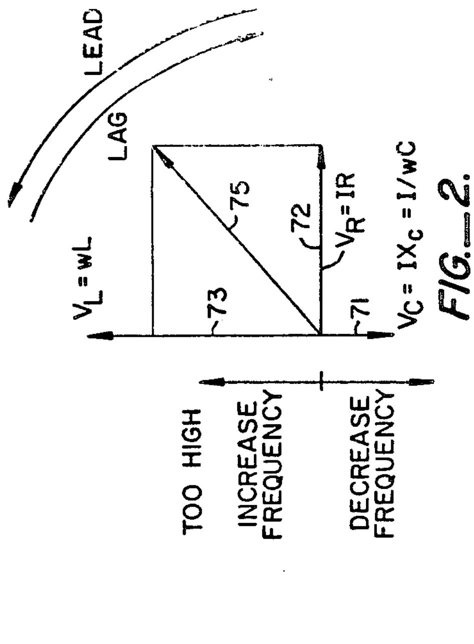
FIG. 2 is a conventional reactance diagram of inductive and capacitance vectors with overall circuit reactance being shown in a vector format in a condition of lead.

Referring to FIG. 2, the familiar vector reactance diagram for an RLC circuit is shown for purposes of illustration. Here, a capacitance reactance vector 71, a resistance reactance vector 72 and an inductive reactance vector 73 are all illustrated.

As is known from theory, the reactance vectors change with circuit frequency. An overall reactance vector 75 results depending upon whether "lag" or "lead" is encountered.

In the example here given, the circuit voltage leads the load voltage. Vector 75 is ahead of vector 72.

If the circuit is to be tuned, vector 75 must be brought into coincidence with vector 72.

As is known from classical physics, tuning of the circuit as by increasing frequency causes a lag to be imposed upon vector 75. The vector will move until it is coincident with the load vector 72 and optimum oscillation will occur with minimum power consumption.

Referring back to FIG. 1, it will be seen that an overall frequency output is taken at voltmeter connection 40. This voltage is plotted at FIG. 3D.

Similarly, voltage oscillator O will output a voltage in the order of that shown by the square wave of FIG. 3B. In FIG. 3B an approximate 50% duty cycle is illustrated.

The duty cycle of the voltage of FIG. 3B is generated herein by a ramp circuit shown oscillating at a frequency of 80 kHz in the example of FIG. 3A. A trigger level voltage 80 is shown operating on the successive ramps 82. Simply stated, when the voltage is ramped as at 82 and crosses the trigger level 80, the oscillator fires to generate the respective square wave. As can plainly be seen when the voltage level 80 is lowered, firing occurs for a longer time and the duty cycle is increased. Where the level is raised, firing occurs for a shorter time and the duty cycle is decreased.

When the voltage oscillator is effectively filtered it puts out a sinusoidal voltage component in the form of that illustrated in FIG. 3.

Phase adjustment of the frequency differential such as those produced in FIG. 2 results from a comparison. This comparison is the voltage output of FIG. 3C with respect to FIG. 3D. Comparison occurs preferably at one of the zero crossings, here the rising zero crossings of the voltage generated at FIG. 3C.

Comparing FIG. 3D to FIG. 3C, we see a case of voltage lag being illustrated. Sampling at the positive zero crossing of the curve of FIG. 3C will occur at 40 kHz. By timing the sampling and integrating it, a negative component will be illustrated, such as the negative component of FIG. 3E. A voltage lag condition results.

With a voltage lag condition, the frequency must be increased. Increase in frequency is caused by shortening the individual ramps 82 of FIG. 3A. As the ramps as shortened the frequency increases, the respective voltage curves of FIG. 3C come into phase and tuning of the circuit results.

The circuit has been described for lag. It will be apparent to the reader that with opposite comparisons and opposite polarity at the integration illustrated in FIG. 3E, the circuit lead condition may likewise be corrected.

It is important to note at this point, that correction is a function of circuit control. It is not an independent function of the load, load condition or voltage for driving the power supply. Thus, it can be seen that the power supply is readily adaptable.

Having set forth the theory and timing diagram for operation, a brief description of the operating parameters of this invention can be understood.

Remembering the curve of FIG. 4 and referring to FIG. 1, it will be seen immediately that current sensor 50 and the duty cycle control 52 will force the circuit to reach a rapid strike voltage 60 and thereafter cause the current to settle immediately upon realizing the linear maintenance voltage. Typically, current flow will be adjusted so that the current settles with the voltage maintained at the maintenance level. Minimum power loss in light operation will be incurred.

Additionally, it can be seen that should the neon load 38 have its voltage requirements drastically altered, again the circuit will oscillate with voltage sufficient to drive the required current through the load 38. The output of the power supply will vary up to capacity with sufficient voltage to drive the neon load 38.

Action with line voltage changing within reasonable limits will be similar. Circuit tuning will occur on an automated basis.

Having discussed the operating parameters, attention will now be delayed to the actual circuitry.

Figure 5A:
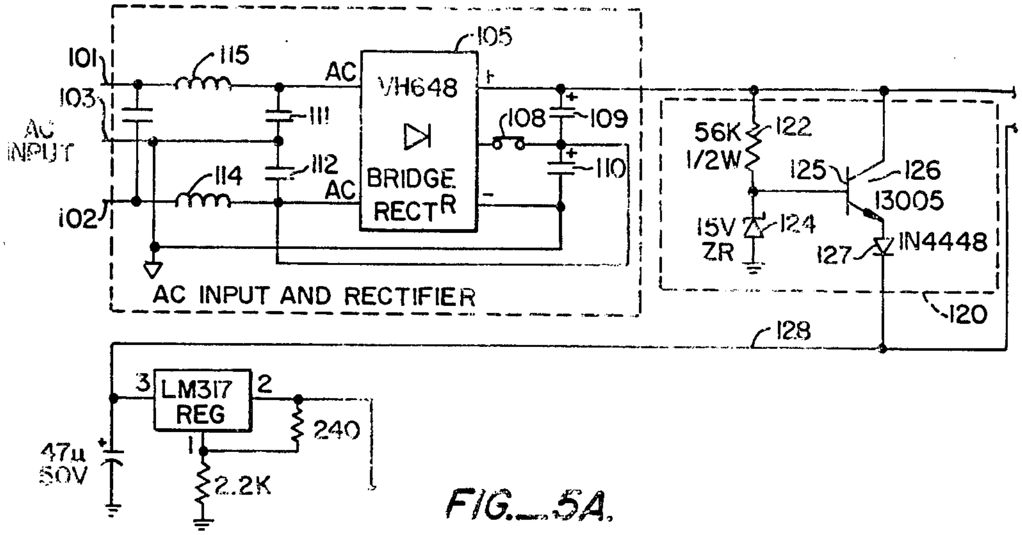
FIG. 5A is a circuit diagram of the voltage doubler or full wave rectifier.

Referring to FIG. 5A, power in is on lines 101, 102 with a ground connection at 103. A standard integrated bridge rectifier 105 provides a nominal 330 volts DC. At it is known in the art, this circuit can be configured as a voltage doubler with a link 108 open for 115 volts 60 hertz current. This link can be cut or left out for 230 volt 50 hertz current. As will hereinafter be set forth, the circuit is widely responsive to line voltage variation.

The circuit includes doubler capacitors 109 and 110 operating on the respective outputs of the rectifier. Radio frequency blocking capacitor 111, 112 together with blocking inductors 114, 115 prevent the propagation of radio frequencies to the line voltage source.

This circuit is powered with analog logic and started with analog logic. It has therefore been found desirable to provide a starter circuit 120. Starter circuit includes a step down resistor 122 coupled to ground across a 15 volt Zener diode 124. The 15 volt reference level of the Zener diode is tied to the gate 125 of an emitter follower transistor 126 which through a blocking diode 127 provides a start-up power voltage. As will hereinafter become more apparent, once power from the normal power supply appears on line 128, diode 127 blocks off the emitter transistor 126; current to longer flows through the start-up circuit.

Figure 5D:
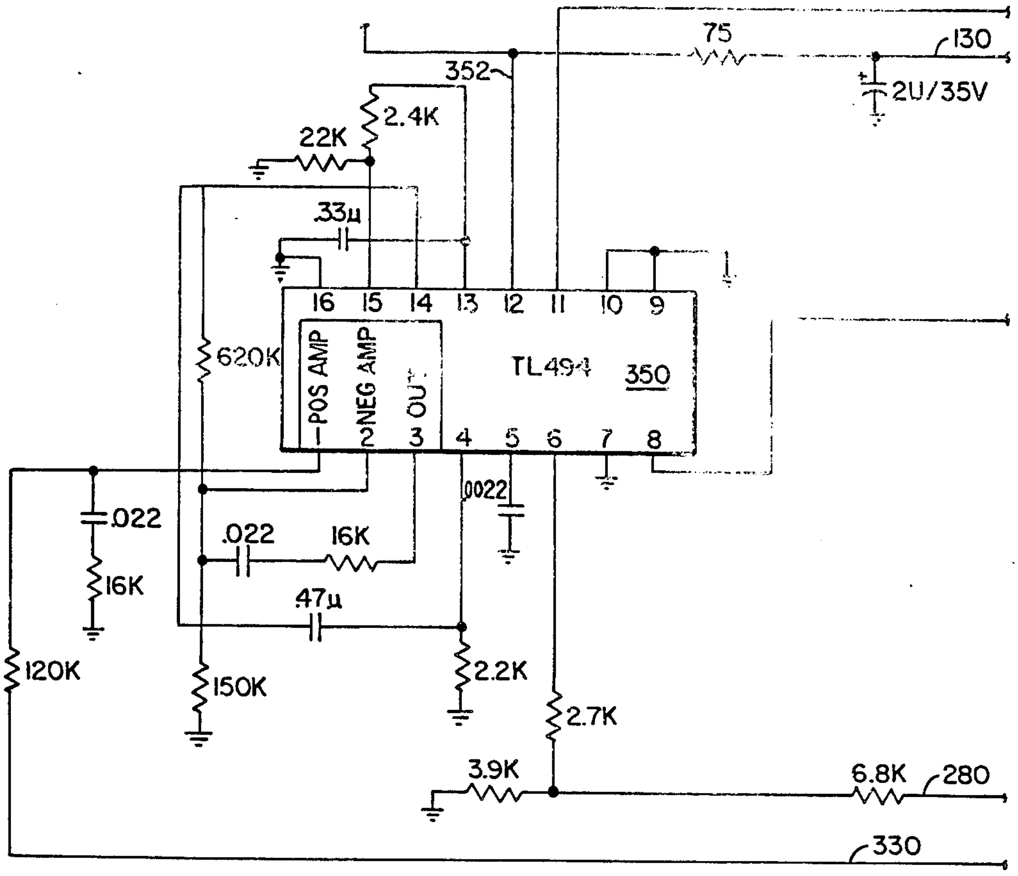
FIG. 5D is a circuit diagram of the oscillator.
Figure 5B:
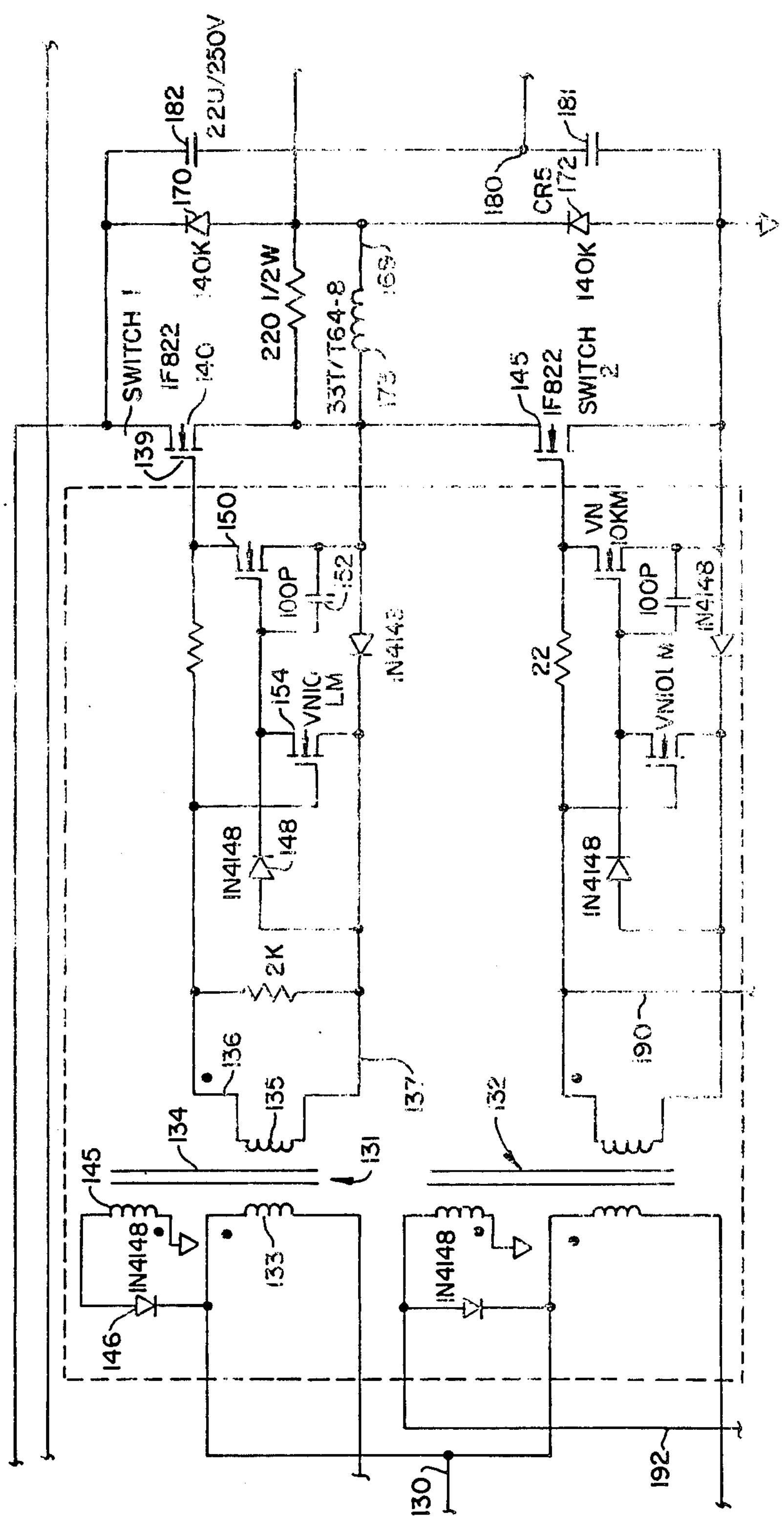
FIG. 5B is a circuit diagram of the power switch drive.

Having explained the starter circuit, reference now will be had to the power switch drive circuit of FIG. 5B. In this discussion, it will be assumed that the oscillator is outputting the proper frequency and duty cycle of signal. The adjustment of the frequency in duty cycle will be later discussed.

The oscillator receives an output drive on line 130. Line 130 drives paired transformers 131, 132.

A discussion will be had of the drivers relating to transformer 131. Since the driver for transformer 132 is in all cases practically identical, this discussion should be simplified.

A primary coil 133 energizes core 134 of transformer 131 and typically drives the secondary coil 135 positive at end 136. When line 136 goes positive, gate 139 of field effect transistor 140 (FET 140) is turned on.

Referring to the diagram of FIG. 6A, one can see the resultant wave shape commencing at 142 and rising to edge 143.

The oscillation at 133 will cease. Core energy will be dumped through coil 145 and diode 146 back into the oscillating circuit. The transformer 131 will be demagnetized.

This will cause point 136 to go negative and point 137 to go positive relative to coil 135. With line 137 positive, diode 148 will conduct to open field effect transistor 150. Field effect transistor 150 will drain gate 139 of field effect transistor 140 clamping the FET shut and preventing noise from opening the circuit. A capacitor 152 will serve to hold field effect transistor 150 in the on position. At the same time, field effect transistor 154 will be in the off state. The circuit will remain clamped until the next positive portion of the oscillator is encountered.

In practice, the diode 148 forms a portion of the field effect transistor 154. Likewise the capacitance 152 forms a portion of the field effect transistor 150. Since both of these field effect transistors 150, 154 appear as if they have a capacitance and diode placed across them, they in effect maintain the switch 140 in the closed position.

Stopping here, the reader can see how the wave form at FIG. 6A is generated. Unfortunately, if such a wave form were allowed to drive the circuit here disclosed, not only would hard edges generating deleterious Fourier components be experienced, but there would be overall danger of burning out this circuit. Specifically, the diodes 170, 172 on either side of the circuit input 169 have 200 nanosecond reverse time. This 200 nanosecond reverse time compares to a 50 nanosecond interval required to damage beyond repair the field effect transistors 140, 145. Therefore, a way must be found to commutate the circulating current.

When the field effect transistors 140, 145 are clamped shut, current, flows through the respective diodes 170, 172. When field effect transistor 140 is closed, diode 172 permits current flow across inductor 173 to reach the wave form of FIG. 6B. Likewise when field effect transistor 145 is closed, diode 170 permits current flow across inductance 173 to generate the wave form.

There results across a center tap 180 and balanced capacitors 181, 182 a 165 volt swing for driving the RLC circuit of this invention.

The drive to FET 145 is similar to the drive to FET 140. Two details are worthy of note.

First, there is a line to help sample current flow denominated 190.

Second, there is a small line 192 for driving of a power supply for the control circuitry.

Figure 5C:
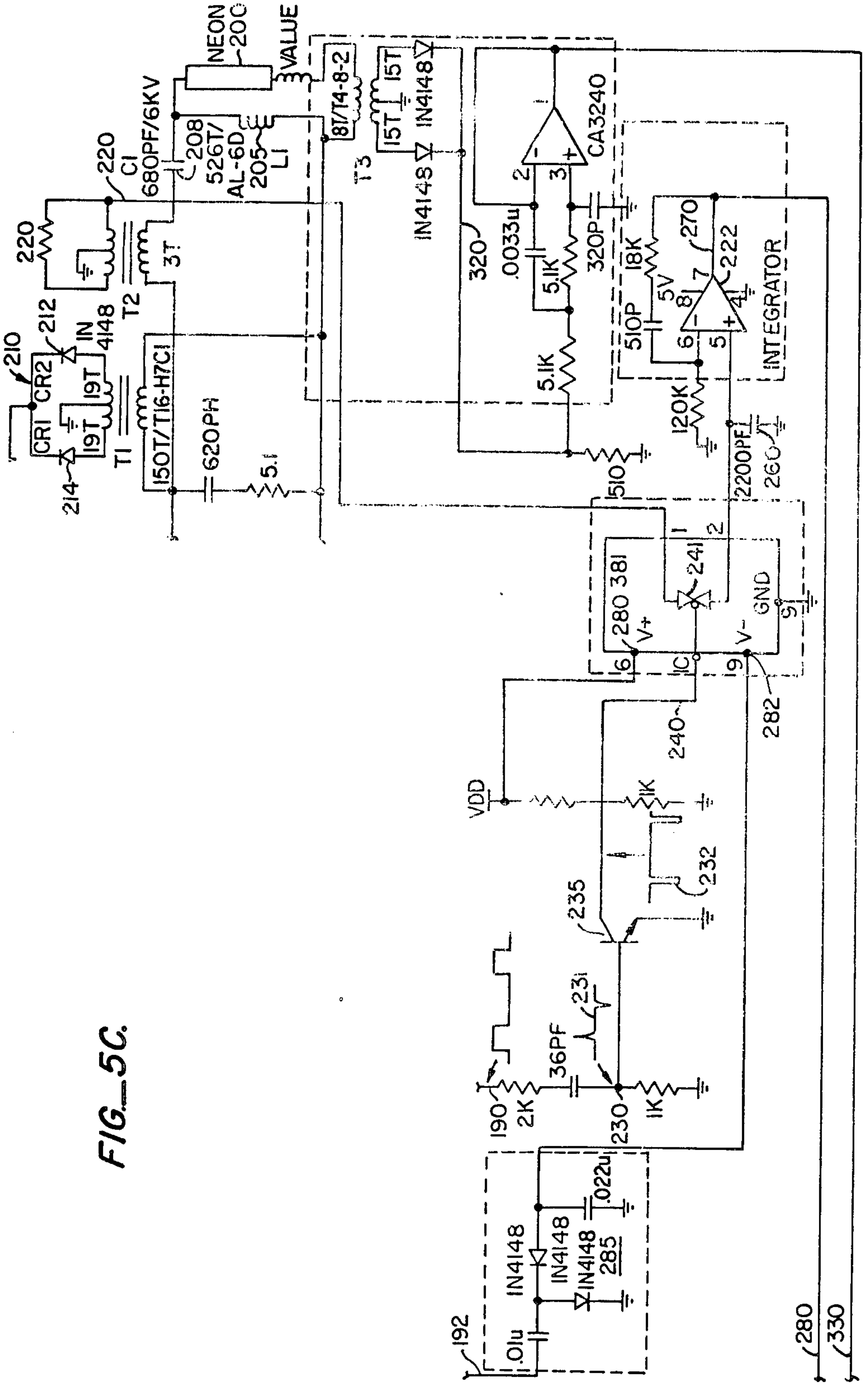
FIG. 5C is a circuit diagram of the oscillating circuit.

Having set forth the power switch drive circuit, attention will now be devoted to FIG. 5C.

The RLC circuit is illustrated in FIG. 5C. Specifically, a neon 200 is shown in parallel with an inductor 205. A capacitance 208 completes the RLC circuit.

The main system power supply is illustrated at 210. Specifically, a transformer T1 passes its output through simple rectifiers 212, 214. The standard power supply voltage is generated. It is this generated voltage which provides the power supply which blocks out diode 127 to disable the starting power supply illustrated with respect to FIG. 5A.

The reader will remember that it is necessary to measure the circulating current. Accordingly, a second transformer T2 provides a current sensing transformer output 220 which is input to an integrator 222.

Referring to line 190 at tap 230, a pulse or spike wave form appears. This pulse opens a gate to transistor 235 on the negative edge only causing sample pulses, the spike voltage and sample voltages being illustrated in detail 231 and 232. The transistor outputs through a sample line 240 to the positive side of integrating amplifier 222. A sample hold capacitor 260 averages the voltage to the input side of the amplifier 222. Dependent upon the time of sample as illustrated with respect to FIGS. 3A-3E, the output 270 of the amplifier will be either positive or negative. This output will occur along line 280.

As an aside, it is necessary for the gate 241 inputting to one leg of the amplifier 222 to be provided with a standard circuit having a positive voltage at input 280 and a negative voltage at input 282. In order to provide this negative voltage, a −20 volt doubler 285 is provided powered from line 192. As this doubler is conventional, it will not further be explained here.

Referring further to FIG. 5C, a load current sensing and maintenance transformer T3 is illustrated. Transformer T3 has an output at line 320 again to the input 325 of an amplifier. A 20 kHz active filter is provided the amplifier so that the necessary duty cycle control line voltage appears on line 330.

In sum and flowing as outputs from the portion of the apparatus shown in FIG. 5C, a voltage 280 is present (+ or − with magnitude) to speed up and/or slow down the oscillator.

At the same time, a constant level of duty cycle control voltage appears at line 330. This duty cycle control voltage enables the duty cycle of the switching transistors.

Completion of the understanding of this circuit may now be had with reference to FIGS. 5D.

A TL494 integrated circuit 350 with pin connections actually shown has an input of the voltage to drive a built-in oscillator. This voltage controls the period of oscillation, which period is output on drive line 352 to power the power switch drive at line 130 (see FIG. 5B). At the same time, the duty cycle voltage appears on line 330 and is input to the pin 1 of circuit 350 which constitutes the input leg of the amplifier. This is amplified to an output voltage at pin 3 on line 354 which controls the duty cycle.

Regarding the remainder of the circuitry surrounding integrated circuit 350, this is conventional wiring to a TL494 being utilized as a combination oscillator and duty cycle drive. It will not further be discussed herein.

Figure 7:
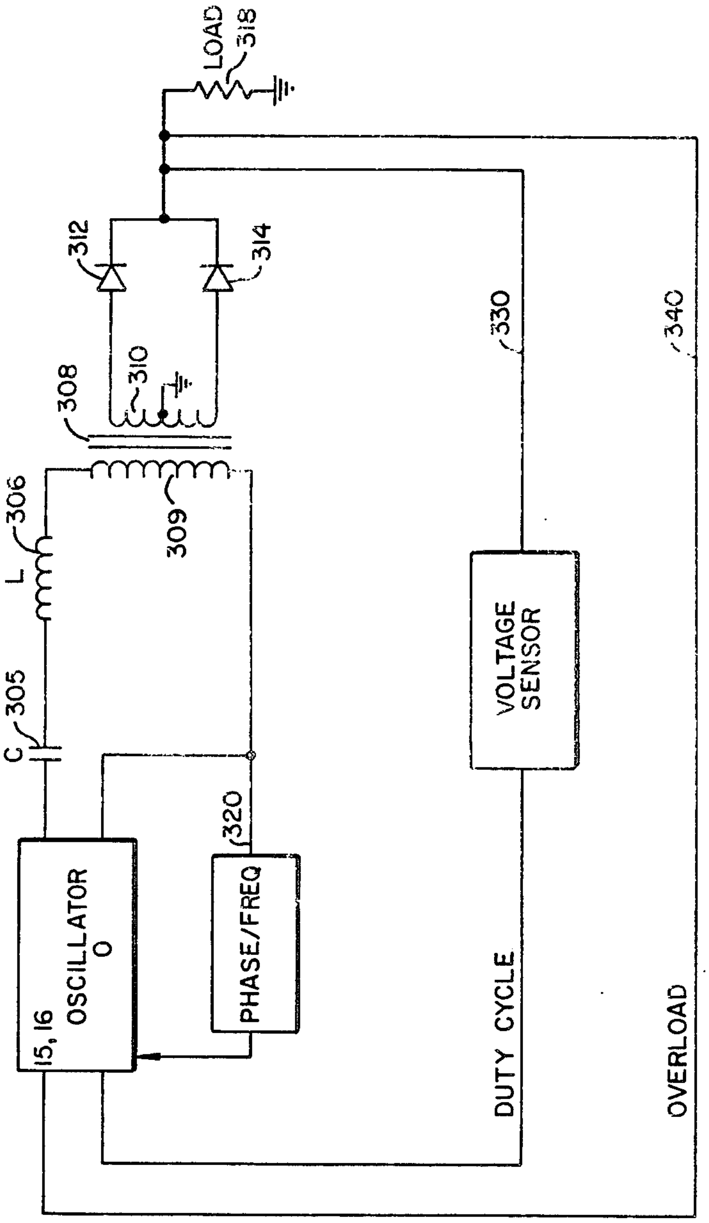

The reader will appreciate that the disclosed circuit can be used for a conventional power supply. Referring to FIG. 7 such a circuit is illustrated. Oscillator O is shown connected to a classical RLC circuit including capacitor 305, inductance 306 and a transformer 308. Typically, transformer 308 is a simple toroidal step-down transformer with a center tab to ground. The transformer primary 309 passes energy to the center tap transformer 310. Two diodes 312, 314 drive a load 318.

Control is provided as before. Broadly, tuning of the circuit occurs at a frequency control 320. Voltage is maintained by a voltage sensor 330 adjusting the duty cycle as before. An overload sensor 340 is provided which connects to pins 15 and 16 of integrated circuit 350. These pins have the effect of shutting the oscillator down in case the power supply is short circuited.

It will be noted with respect to FIG. 7 that the load is in series with the two reactive elements.

The paired diodes 312, 314 operate up to five times the frequency that they could operate in conventional switching. This is because there is a sine wave present in the circuit. Reverse recovery problems are obviated. Those skilled in the art will appreciate that a rectifier at 100 volts PIV capable of 12 amps if available would cost at least twenty times the cost of a conventional 300 nanosecond rectifier with 100 PAIV at 12 volts. In short, the disclosed circuit utilizes ordinary, slow closing rectifiers with the sine wave drive disclosed. It will additionally be observed that transformer 308 can be toroidal since there is no DC component in the output.

Those having skill in the art will realize that this circuit will have many variations. For example, we have shown control at integrated circuit 350 by varying the frequency and voltage into the chip. The reader will appreciate that the capacitor to pin 5 of integrated circuit 350 could as well be varied to effect circuit control.

Having seen the disclosure, it will be noted that a dwell RLC circuit could be constructed using one driving switch from the oscillator. In this case, the inductance of the RLC circuit would be center tapped with one end grounded. Driving could occur, by way of example, at the center tap to resonate the circuit. Such a construction is not preferred.

Figure 8:
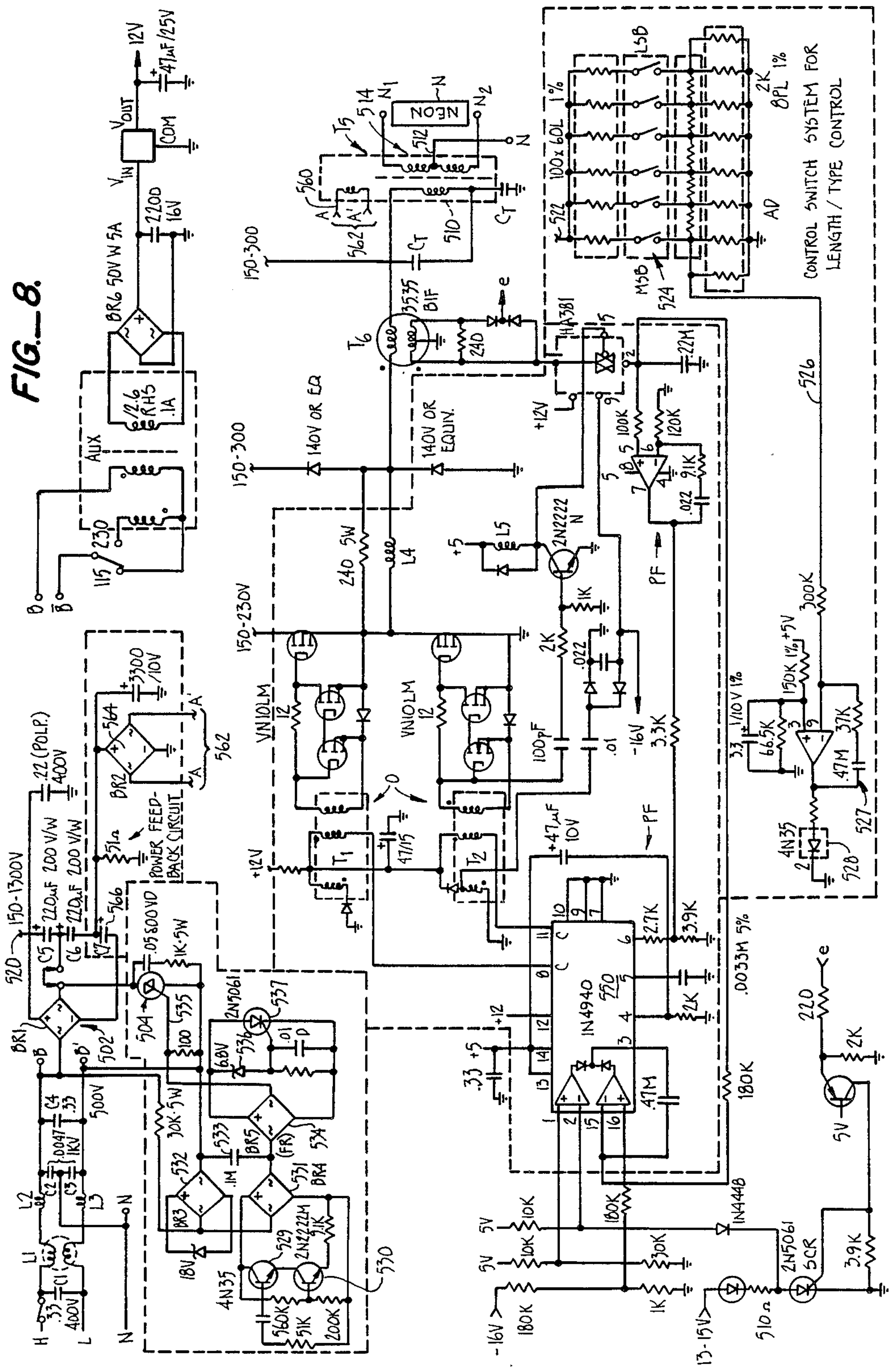
FIG. 8 is a circuit diagram of the preferred embodiment of the continuation-in-part application filed herein.

Having experimented extensively, and with the filing of this continuation-in-part, the embodiment of FIG. 8 now becomes the preferred embodiment of the invention. In similarity with my earlier disclosed circuit, a frequency doubler circuit 500 is illustrated. This circuit drives a bridge 502 which is supplied with a duty cycle at a triac 504. The output of the bridge circuit as controlled through triac 504 drives the oscillating oscillator O. Oscillator O outputs to the RLC circuit including the primary 510 of a transformer T5.

Transfer T5 will hereinafter be discussed in detail. It will be sufficient at this juncture to note that the transformer is center tapped at 512 and has a secondary 514 across which neon tube N is connected.

As before, transformer T6 measures the phase and passes the phase through a phase frequency control PF. Output of the phase frequency control PF occurs through pins 11 and 8 of an integrated circuit 350. This is conventional wiring to a TL494 being utilized as a combination oscillator and duty cycle drive. The conventional aspects of the circuit similar to those previously set forth will not be further discussed herein.

Having conventionally outlined in FIG. 8, the differences in this circuit over that previously disclosed will now be emphasized.

First, emphasis will be placed on the duty cycle of triac 504 to provide in effect an amplitude modulated input to the oscillator 0 to maintain the required circuit voltage. Thereafter, the circuit feeding back from the transformer primary into the amplitude modulation of the power input to the oscillator will be discussed. Finally, the parameters of the transformer and its selection for optimum circuit oscillation will be set forth.

Regarding measurement and feedback of the oscillator voltage, the input voltage to the oscillator at 520 inputs to a resistor network at 522. Resistor network comprises a group of resistors in parallel and series switched by a plurality of switches 524. As is known to those having acquaintance with electrical engineering, closing one or more of the switches 524 changes the resistance in the circuit and consequently the voltage output on line 526 to integrator. Integrator amplifier 527 outputs through an opto-isolator at light source 528 to optical sensor 529. Switching of the optical sensor 529 depends upon the output of the integrator amplifier.

Broadly, transistor 530 acts as a current source for the optical switch 529. Output of the current source 530 occurs into a first bridge circuit 531. This circuit outputs through a Zener clamped bridge circuit 532 clamped at 18 volts. Dependent upon the current flow of the optical switch 529, through the current source 530, a capacitor 533 takes varying intervals of the input current cycle to charge. Discharge of the capacitor 533 occurs through a bridge circuit 534. Simply stated, a Zener diode 536 maintains a constant potential across an SCR 537. When the voltage in capacitor 533 exceeds the voltage in the Zener 536, discharge of the capacitor occurs. This fires triac 504. The triac is in effect "amplitude" modulated.

I have used the word amplitude modulated because the triac in effect clips the normal sine wave of energy input into the oscillator. It may just as well point out that the triac is duty cycled, pulse width modulated or the like. What is important is that the power exciting the oscillator is controlled responsive to the voltage of the oscillator input. The input by being passed through a resistance network and being integrated feeds back to maintain the desired degree of excitation in the RLC circuit and hence the proper glow to the neon tube.

Having set forth the oscillator circuit, I will now discuss the feedback of the inductive energy from the primary of transformer of T5 to the input of oscillator O.

Referring to transformer T5, it is shown with an extra winding tap 560 on the primary. Winding tap 560 puts out on lines 562 which are in turn rectified at a bridge circuit 564. Bridge circuit outputs to a capacitor 566 the voltage in effect tapped by turns 560 and rectified at bridge circuit 564. It is readily seen that the voltage at capacitor 566 is in series with the input voltage to the oscillator O. Stated in other terms, when the voltage amplitude control reads the desired voltage across the primary of transformer T5, its reading will be altered. It will be altered by the voltage appearing at capacitor 566 in series with the reading that might otherwise occur.

The effect of this portion of my circuit is to suppress neon oscillation at neon tube N. Simply stated, where negative resistance or non-linearities cause circuit oscillation, the input to the oscillator is controlled. It is controlled in a wattless manner to oppose or prevent the oscillations through the disclosed power feedback circuit to the voltage of the oscillator input.

Having set forth the power feedback portion of the circuit, attention will now be given to the design of the output transformer.

Transformer T5 is carefully selected. Specifically, I utilize a U-shaped ferrite core having 110 turn primary and a 1200 turn secondary, the secondary being center tapped for safety purposes. The primary inductance has a 2.6 milli-Henry value; the secondary inductance includes a 338 milli-Henry value. The transformer has a 0.78 coupling factor.

Good insulation is required. The driving of a 24-foot neon tube, a 1900 volt peak-to-peak voltage can be seen across the transformer.

The transformer is driven nominally at 31 kHz. It is sized, however, to emphasize the third harmonic or to oscillator in the RLC circuit at a frequency of 63 kHz. Sizing of the transformer to emphasize the third harmonic can be done by those having skill in the art utilizing a Hewlett-Packard 71 computer and the Hewlett-Packard AC Steady State Circuit Analysis Pack provided by the Hewlett-Packard Company of Corvallis, Or. The program entitled CNAP gives the transformer oscillation outputs for the respective input.

The transformer select has a 0.78 coupling factor with a 15/1000 gap. The relatively high leakage inductance forms a composite part of the RLC circuit I disclose.

Figure 9:
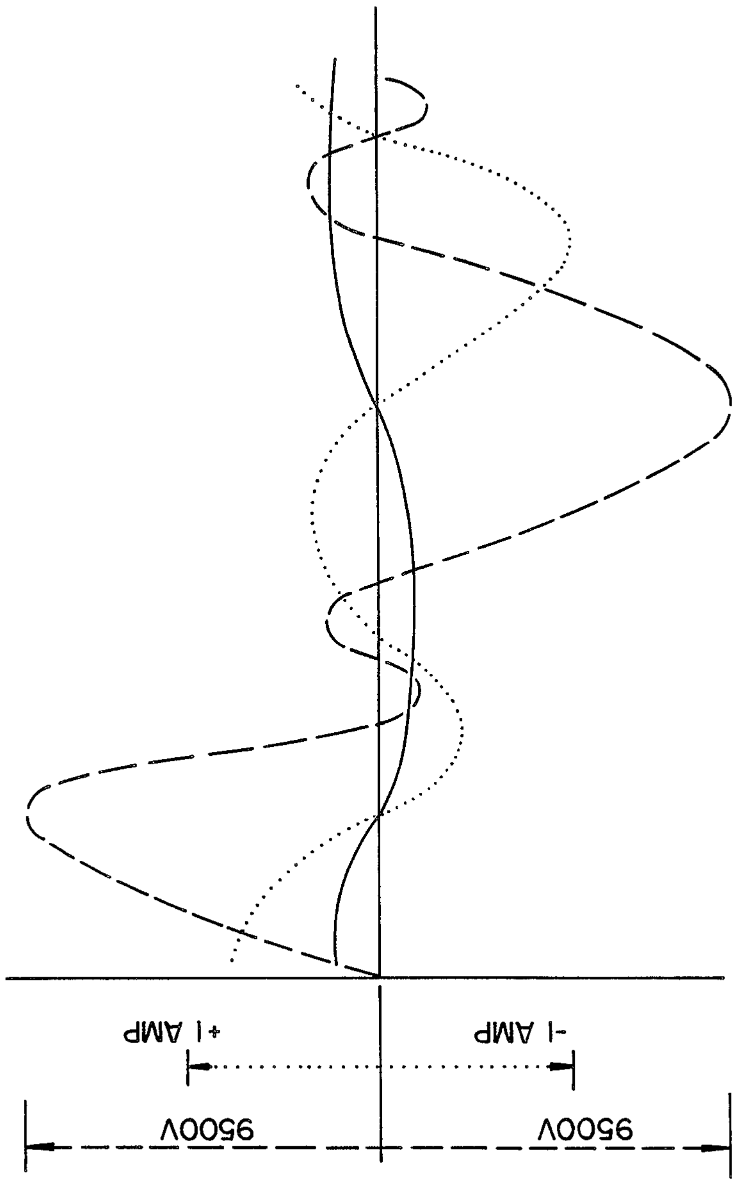
FIG. 9 is a graphic representation of current versus voltage illustrating the advantages of the transformer sizing herein utilized.

Referring to FIG. 9, the result of the sizing of this transformer can be illustrated.

Simply stated, the observer can see that the voltage oscillating from peak to peak in sympathy with the primary oscillation of 31 kHz makes the requirement excursion to generate the required peak-to-peak voltage necessary to excite the neon.

The current flow, however, primarily oscillates as the third harmonic. Because of the required voltage excursion, the current wave form has its median displaced from the neutral axis so as to cause in the RLC circuit the required high voltage.

The inductance losses and indeed the size of the transformer only needs to be controlled for the current oscillation. Thus, the transformer which I utilize has a reduced size and cost. It is, of course, necessary that the secondary windings be sufficiently insulated to withstand the full voltage.

I have disclosed a power feedback circuit. The purpose of the power circuit has been to damp oscillations which are non-linear in the neon load. It will be understood that a resistance could as well be placed in series with the neon load and likewise affect damping. However, such a resistance would use power in the order of 2% or 3%. Not only would the power consume by the entire circuit increase, but the resultant heat generated would have to be dissipated. I therefore prefer the power feedback scheme disclosed.

I have disclosed a circuit which in effect monitors the level of power in the oscillator. This monitor level of power is fed back to amplitude modulate the power input to the oscillator. As I have described, it is most convenient to feed this signal through a switch resistance network in order to drive the RLC circuit at the desired level.

I prefer to monitor the voltage input to the oscillator. It is sufficient, however, if the power level in the oscillator is monitored and fed back to the input at the oscillator.

I do not monitor, as before, the level of the RLC circuit. To do so, inevitably adds a resistance in addition to the resistance of the neon. This is not desired because at a minimum additional heat is generated. Other complications can follow.

Likewise I have shown a circuit for tapping energy from the inductance of the RLC circuit and feeding that energy back to the measure of power from the oscillator. I prefer to do this with the windings on the transformer primary. Any other power measuring means or coupling from a reactance element of the RLC circuit (the inductor or a capacitor) will serve as well for the purposes of this disclosure. The single winding I show is preferred.

What is claimed is:

1. A tuned radio frequency power supply for powering a load comprising in combination:

- an oscillator having a variable frequency and variable power driving source;
- an RLC circuit having a load connected thereto and including a first inductance reactance element and a second capacitance reactance element said RLC circuit connected to the output of said oscillator, said inductance reactance element being a transformer, said transformer sized to emphasize the third harmonic of the frequency of said RLC circuit;
- a frequency sensor connected across the current flow in the RLC circuit outputting to a phase comparator;

a phase comparator for comparing the phase of the oscillator with the phase of the circuit for changing the frequency of the oscillator to tune said circuit for minimum reactance load and maximum resistive load;

a sensor operatively connected to the power driving source of the oscillator for sensing the power sufficient to drive the load and varying the variable power driving source to said oscillator, said sensor outputting to the variable power driving source to cause said oscillator to have an amplitude sufficient to force a required level of voltage and current through the RLC circuit.

2. The invention of claim 1 wherein said sensor for said power driving source is a voltage sensor on the input.

3. The invention of claim 2 and including a transformer having a primary winding and a secondary winding, said transformer connected at said primary winding to said RLC circuit and at said secondary winding to a load.

4. The invention of claim 1 and wherein said first inductance reactance element includes means for tapping said first inductance and said sensor connected to said power driving source includes an output from said means for tapping said first inductance whereby said power driving source is modulated in power output to power said oscillator responsive to and in damping opposition to non-linear oscillations of said RLC circuit.

5. The invention of claim 1 and wherein said sensor as connected to said power driving source for said oscillator includes a switched resistance network for optimizing said power driving source output to maintain said RLC circuit at a desired current and voltage.

6. A tuned radio frequency power supply for powering a load comprising in combination:

an oscillator having variable frequency and power output, and variable power input;

an RLC circuit having a load and first and second reactance elements, said RLC circuit driven by said oscillator, said first reactance element being a transformer, said transformer sized to emphasize the third harmonic of the frequency of said RLC circuit;

a frequency sensor connected across said RLC circuit outputting to a phase comparator;

a phase comparator for comparing the phase of said oscillator with the phase of said circuit operatively connected to said oscillator for changing the frequency in said oscillator to tune said circuit for minimum reactance load ahd maximum resistive load;

a load connected to said RLC circuit including a primary coil within said RLC circuit and a secondary, said transformer secondary outputting to the load;

a sensor connected to the oscillator for sensing the power into said oscillator and varying the amplitude of the variable power input to said oscillator to a sufficient level to force a required voltage in said RLC circuit.

7. The invention of claim 6 and wherein said load is a neon tube.

8. The invention of claim 7 and wherein said transformer includes means for power coupling for extracting energy therefrom, said winding having an output; the output of said power coupling inputting to said sensor at the variable power source input to said oscillator to control the amplitude output to said oscillator responsive to said non-linear variations in said load.

9. In a power supply having an oscillator with variable frequency and variable power input driving an RLC circuit with a load connected to said RLC circuit, the improvement in said oscillator including:

a frequency sensor connected across the RLC circuit outputting to a phase comparator;

a phase comparator for comparing the phase of said oscillator with the phase of said circuit for changing the frequency of said oscillator to tune said circuit for minimum reactance load and maximum resistive load;

and a power sensor means having first and second power sensors, said first power sensor connected to the oscillator, said first power sensor outputting to the variable power input of said oscillator to cause said oscillator to have an output sufficient to force a required level of power and voltage through the RLC circuit, said second power sensor tapping the power of said RLC circuit and said second power sensor outputs to the sensor of the variable power input to said oscillator responsive to variations of load in said RLC circuit.

10. In a power supply having an oscillator with variable frequency and variable power input for driving an RLC circuit with a load connected to said RLC circuit, the improvement in said oscillator comprising:

a frequency sensor connected across the RLC circuit outputting to a phase comparator;

a phase comparator for comparing the phase of said oscillator with the phase of said circuit for changing the frequency of said oscillation to tune said circuit for minimum reactance load and maximum resistive load;

a power sensing circuit connected to said oscillator, said power sensing circuit modulating the variable power input to said RLC circuit for controlling the voltage in said RLC circuit; and, means for feeding back power responsive to the power in said RLC circuit, said power feedback means operatively connected to said power sensing circuit of said oscillator to vary the voltage therein responsive to non-linearities in said load.

11. The power supply of claim 12 and wherein said means for feeding back power responsive to the power in said RLC circuit includes a capacitor in series in said power sensing circuit of said oscillator.

12. A tuned radio frequency power supply for powering a load comprising in combination:

an oscillator having a variable frequency, a variable power driving source and an output;

an RLC circuit having a load connected thereto and including a first inductance reactance element and a second capacitance reactance element said RLC circuit connected to the output of said oscillator; said sensor output from said means for tapping said first inductance whereby said power driving source is modulated in power output to power said oscillator responsive to and in damping opposition to non-linear oscillations of said RLC circuit;

a frequency sensor connected across the current flow in the RLC circuit outputting to a phase comparator;

a phase comparator for comparing the phase of the oscillator with the phase of the circuit for changing the frequency of the oscillator to tune said circuit for minimum reactance load and maximum resistive load;

a sensor operatively connected to the power driving source of the oscillator for sensing the power sufficient to drive the load and varying the variable power driving source to said oscillator, said sensor outputting to the variable power driving source to cause said oscillator to have an amplitude sufficient to force a required level of voltage and current through the RLC circuit, said first inductance reactance element includes means for tapping said first inductance.

* * * * *